United States Patent
Xu et al.

(10) Patent No.: US 11,064,329 B2
(45) Date of Patent: Jul. 13, 2021

(54) CONTROL-LESS OPERATION FOR COVERAGE LIMITED MACHINE-TYPE-COMMUNICATIONS

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 14/254,528

(22) Filed: Apr. 16, 2014

(65) Prior Publication Data
US 2014/0313999 A1    Oct. 23, 2014

Related U.S. Application Data

(60) Provisional application No. 61/813,002, filed on Apr. 17, 2013.

(51) Int. Cl.
*H04W 72/04* (2009.01)
*H04W 4/70* (2018.01)
*H04W 74/08* (2009.01)
*H04W 74/00* (2009.01)

(52) U.S. Cl.
CPC ......... *H04W 4/70* (2018.02); *H04W 74/0833* (2013.01); *H04W 74/006* (2013.01)

(58) Field of Classification Search
CPC ............... H04W 4/005; H04W 72/042; H04W 74/0833; H04W 74/006

USPC ......................................................... 370/329
See application file for complete search history.

(56) References Cited

U.S. PATENT DOCUMENTS

| | | | | |
|---|---|---|---|---|
| 2009/0238091 A1* | 9/2009 | Kim | ..................... | H04L 5/0091 370/252 |
| 2010/0202382 A1* | 8/2010 | Park | ..................... | H04L 5/0053 370/329 |
| 2010/0278064 A1 | 11/2010 | Jeong | | |
| 2010/0302987 A1* | 12/2010 | Sawahashi | .......... | H04W 72/005 370/312 |
| 2011/0280212 A1* | 11/2011 | Lv | ....................... | H04W 74/002 370/329 |
| 2013/0163536 A1* | 6/2013 | Anderson | ......... | H04W 72/1284 370/329 |
| 2014/0161024 A1* | 6/2014 | Speight | .................. | H04W 4/70 370/315 |

(Continued)

FOREIGN PATENT DOCUMENTS

| | | | |
|---|---|---|---|
| EP | 2302965 | * | 5/2009 |
| EP | 2302965 A1 | * | 5/2009 |
| KR | 20110081960 A | | 7/2011 |

(Continued)

OTHER PUBLICATIONS

WO2011087274.*

(Continued)

*Primary Examiner* — Christopher M Crutchfield
*Assistant Examiner* — Jean F Voltaire
(74) *Attorney, Agent, or Firm* — Qualcomm Incorporated

(57) ABSTRACT

Certain aspects of the present disclosure generally relate to wireless communications and, more particularly, to techniques for control-less operation for machine-type communications (MTC).

32 Claims, 7 Drawing Sheets

(56) References Cited

U.S. PATENT DOCUMENTS

2014/0328260 A1* 11/2014 Papasakellariou ............ H04W 72/1289
370/329

FOREIGN PATENT DOCUMENTS

| KR | 20110083547 A | 7/2011 |
|---|---|---|
| KR | 20120135887 A | 12/2012 |
| KR | 20130007326 A | 1/2013 |
| WO | WO 2001/087274 A2 * | 7/2011 |
| WO | WO-2011087274 A2 | 7/2011 |
| WO | WO-2012024346 A1 | 2/2012 |

OTHER PUBLICATIONS

EP2302965.*
WO2011087274 (Year: 2011).*
EP2302965 (Year: 2011).*
Alcatel-Lucent, et al., "Feasibility of coverage extension of physical channels for MTC devices," 3GPP Draft; R1-130462—REL-12 MTC Coverage—Coverage EXT PHY Channels V0.3, 3rd Generation Partnership Project (3GPP), Mobile Competence Centre; 650, Route Des Lucioles; F-06921 Sophia-Antipoles C, vol. RAN WG1, No. St Julian; Jan. 28, 2013-Feb. 1, 2013, Jan. 19, 2013 (Jan. 19, 2013), XP050663744, 7 pages, Retrieved from the Internet < URL: http://www/3gpp.org/ftp/tsg_ran/WG1_RL1/TSGR1_72/Docs/ >, [retrieved on Jan. 19, 2013].
China Telecom: "Discussion on coverage improvement for MTC," 3GPP Draft; R1-124793, 3rd Generation Partnership Project (3GPP), Mobile Competence Centre; 650, Route Des Lucioles; F-06921 Sophia-Antipolis Cedex; France, RAN WG1, New Orleans, USA; Nov. 12, 2012-Nov. 16, 2012, Nov. 2, 2012 (Nov. 2, 2012), XP050662624, 6 pages, Retrieved from the Internet < URL: http://www.3gpp.org/ftp/tsg_ran/WG1_RL1/TSGR1_71/Docs/ >, [retrieved on Nov. 2, 2012].
International Search Report and Written Opinion—PCT/US2014/034473—ISA/EPO—dated Jul. 10, 2014.

Qualcomm Incorporated: "Coverage enhancement techniques for MTC," 3GPP Draft; R1-130589 Coverage Enhancement Techniques for MTC, 3rd Generation Partnership Project (3GPP), Mobile Competence Centre; 650, Route Des Lucioles; F-06921 Sophia-Antipolis Cedex; France, vol. RAN WG1, No. St Julian; Jan. 28, 2013-Feb. 1, 2013, Jan. 19, 2013 (Jan. 19, 2013), 7 pages, XP050663845, Retrieved from the Internet < URL: http://www.3gpp.org/ftp/tsg_ran/WG1_RL1/TSGR1_72/Docs/ >, [retrieved on Jan. 19, 2013] the whole document.
Qualcomm Incorporated: "RACH Coverage Enhancement," 3GPP Draft; R1-131398 PRACH Coverage Enhancement, 3rd Generation Partnership Project (3GPP), Mobile Competence Centre; 650, Route Des Lucioles; F-06921 Sophia-Antipoles Cedex; France, vol. RAN WG1, No. Chicago, USA, Apr. 15, 2013-Apr. 19, 2013, Apr. 6, 2013 (Apr. 6, 2013), XP050697247, 3 pages, Retrieved from the Internet < URL : http://www.3gpp.org/ftp/tsg_ran/WG1_RL1/TSGR1_72b/Docs >, [retrieved on Apr. 6, 2013].
European Search Report—EP19200225—Search Authority—The Hague—dated Jan. 23, 2020.
Qualcomm Incorporated: "Data Channel Coverage Enhancement", 3GPP Draft; R1-131399 Data Channel Coverage Enhancement, 3rd Generation Partnership Project (3GPP), Mobile Competence Centre; 650, Route Des Lucioles, F-06921 Sophia-Antipolis Cedex ; France, vol. RAN WG1, No. Chicago, USA; Apr. 15, 2013-Apr. 19, 2013, Apr. 6, 2013 (Apr. 6, 2013), XP050697248, 2 pages, Retrieved from the Internet: URL:http://www.3gpp.org/ftp/tsg_ran/WG1_RL1/TSGR1_72b/Docs/ [retrieved on Apr. 6, 2013], Considerations for Data Coverage Enhancements; p. 1, paragraph 2—p. 2.
Qualcomm Incorporated: "Enhancement to Small Cells for MTC", 3GPP Draft; R1-131401 Enhancement to Small Cells for MTC, 3rd Generation Partnership Project (3GPP), Mobile Competence Centre; 650, Route Des Lucioles ; F-06921, Sophia-Antipolis Cedex; France, vol. RAN WG1, No. Chicago, USA; Apr. 15, 2013-Apr. 19, 2013, Apr. 6, 2013 (Apr. 6, 2013), XP050697250, 6 pages, Retrieved from the Internet: URL:http://www.3gpp.org/ftp/tsg_ran/WG1_RL1/TSGR1_72b/Docs/ [retrieved on Apr. 6, 2013], Tiered Architecture for Capacity, Coverage and Energy Efficiency; p. 1, paragraph 2—p. 2.

* cited by examiner

CONTROL-LESS OPERATION FOR COVERAGE LIMITED MACHINE-TYPE-COMMUNICATIONS

CROSS-REFERENCE TO RELATED APPLICATIONS

The present Application for Patent claims priority to U.S. Provisional Application No. 61/813,002, filed Apr. 17, 2013, which is assigned to the assignee of the present application and hereby expressly incorporated by reference herein in its entirety.

FIELD

Certain aspects of the present disclosure generally relate to wireless communications and, more particularly, to techniques for control-less operation for machine-type communications (MTC).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced (LTE-A) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices comprise user equipments (UEs) and remote devices. A UE may be a device that operates under direct control by humans. Some examples of UEs include cellular phones, smart phones, personal digital assistants (PDAs), wireless modems, handheld devices, tablets, laptop computers, netbooks, smartbooks, ultrabooks, etc. A remote device may be a device that operates without being directly controlled by humans. Some examples of remote devices include sensors, meters, monitors, location tags, etc. A remote device may communicate with a base station, another remote device, or some other entity. Machine type communications (MTC) refers to communication involving at least one remote device on at least one end of the communication.

SUMMARY

Certain aspects of the present disclosure provide a method for wireless communications, by a user equipment (UE). The method generally includes transmitting a bundled random access channel (RACH) sequence and receiving a RACH response in a bundled physical downlink shared channel (PDSCH). Certain aspects of the present disclosure provide an apparatus for performing a RACH procedure by a UE, including at least one processor configured to transmit a bundled RACH sequence and receive a RACH response in a bundled PDSCH and a memory coupled with the at least one processor. Certain aspects of the present disclosure provide an apparatus for performing a RACH procedure by a UE, including means for transmitting a bundled RACH sequence and means for receiving a RACH response in a bundled PDSCH. Certain aspects of the present disclosure provide a program product for wireless communications by a UE, including a computer-readable medium having instructions stored thereon for transmitting a bundled RACH sequence and receiving a RACH response in a bundled PDSCH.

Certain aspects of the present disclosure provide a method for wireless communications, by a base station (BS). The method generally includes receiving a bundled random access channel (RACH) sequence from a UE and transmitting a RACH response in a bundled physical downlink shared channel (PDSCH) to the UE. Certain aspects of the present disclosure provide an apparatus for performing a random access channel (RACH) procedure by a base station (BS), including at least one processor configured to receive a bundled RACH sequence from a user equipment (UE) and transmit a RACH response to the UE in a bundled PDSCH and a memory coupled with the at least one processor. Certain aspects of the present disclosure provide an apparatus for performing a RACH procedure by a base station (BS), including means for receiving a bundled RACH sequence from a UE and means for transmitting a RACH response to the UE in a bundled PDSCH. Certain aspects of the present disclosure provide a program product for wireless communications by a base station (BS), including a computer-readable medium having instructions stored thereon for receiving a bundled RACH sequence from a UE and transmitting a RACH response in a bundled PDSCH to the UE.

Numerous other aspects are provided including methods, apparatus, systems, computer program products, and processing systems.

DETAILED DESCRIPTION

Aspects of the present disclosure provide techniques relating to control-less operations for machine-type communications (MTC).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
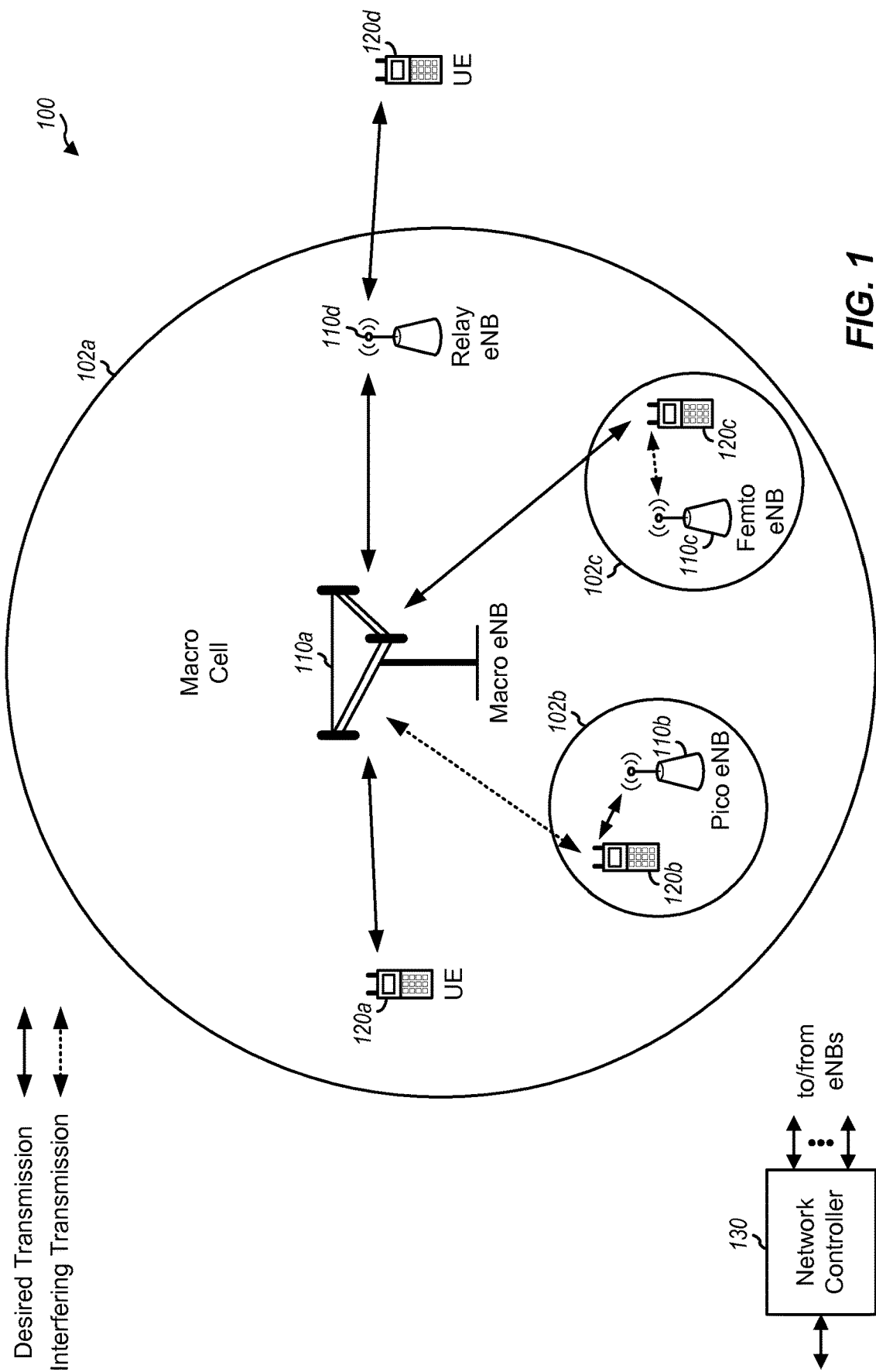
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an eNodeB, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
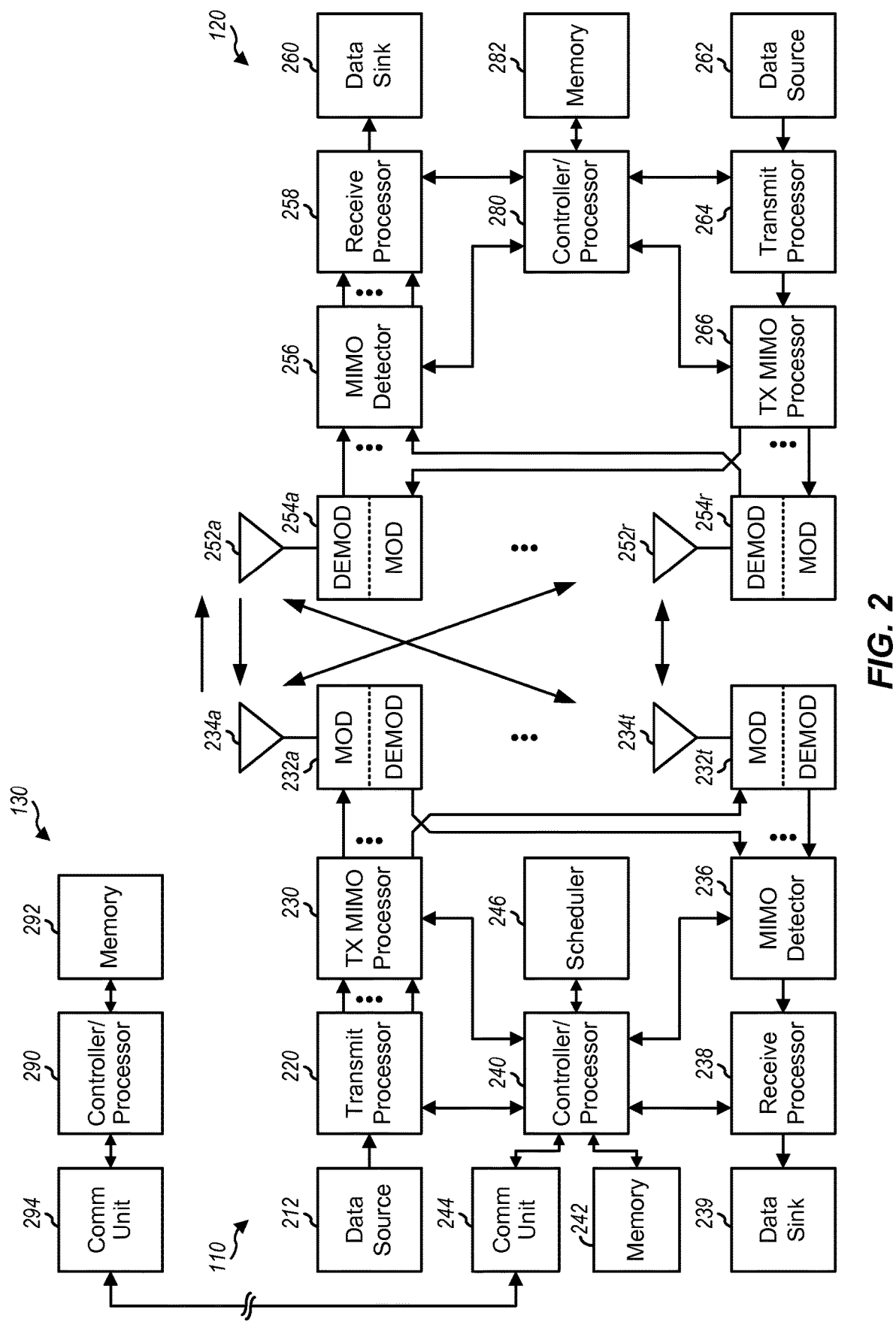
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), reference signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254*a* through 254*r* (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals such as UE-specific reference signals (UE-RS) and/or data in the resource blocks may be precoded using the same precoder. The power level used for the UE-RS in each RB (resource block) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
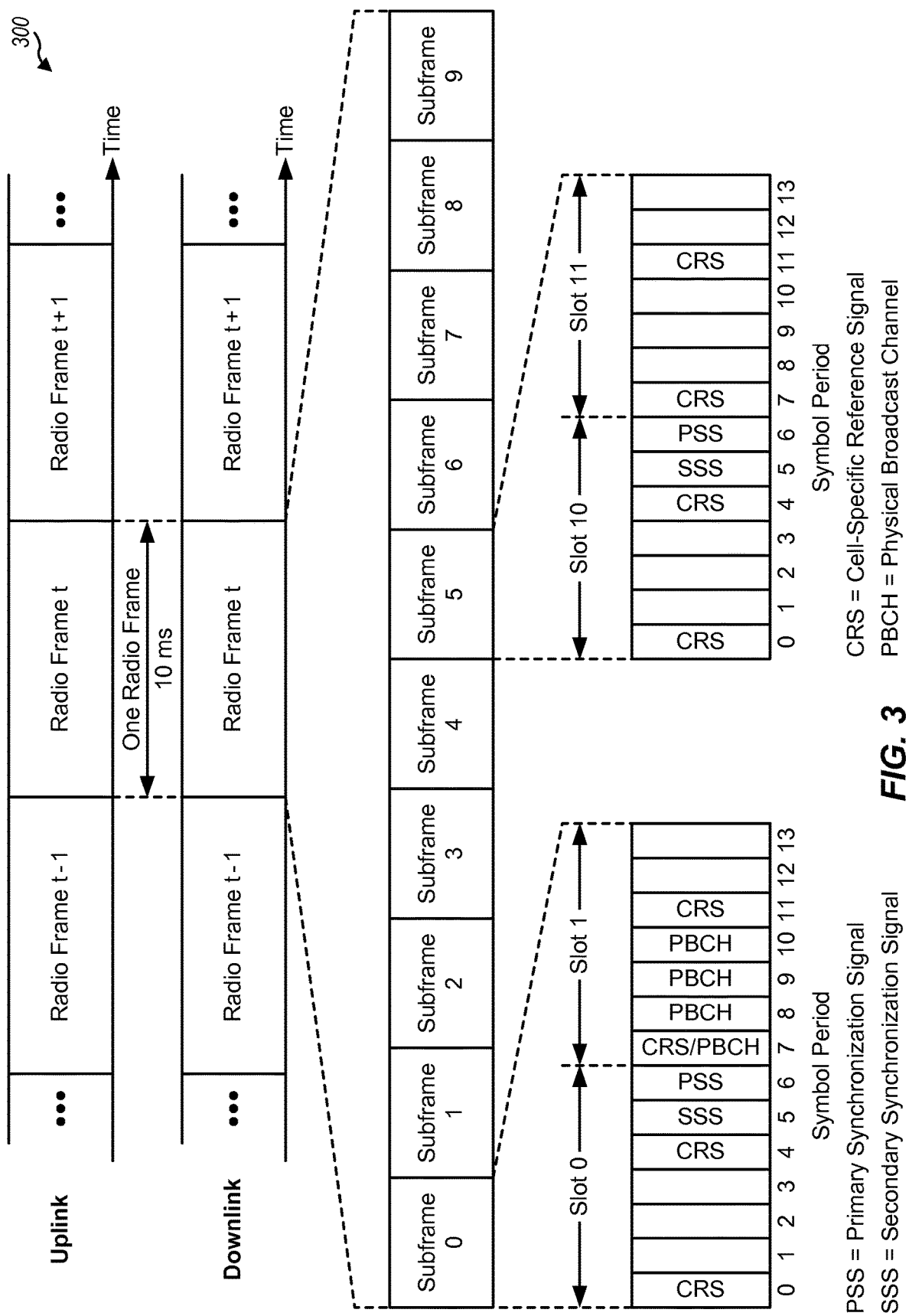
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
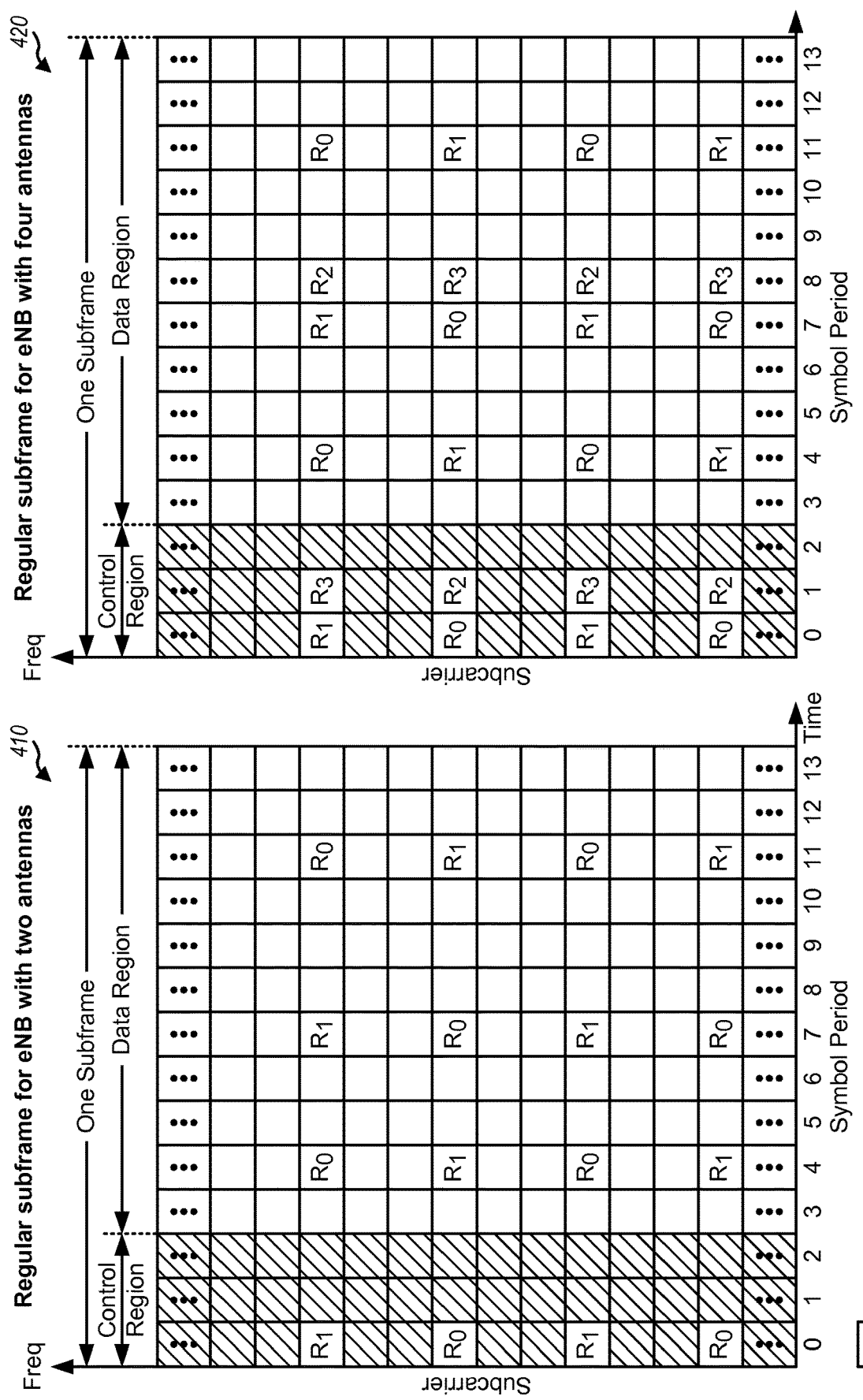
FIG. 4 is a block diagram conceptually illustrating two exemplary subframe formats using normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label Ra, a modulation symbol (e.g., a CRS) may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID, e.g., CRS may be transmitted on odd subcarriers, if the cell ID is odd. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q subframes. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Machine-Type Communications (MTC)

The use of LTE for machine-type communications (MTC) is being considered by LTE study groups. The main focus of the traditional LTE design is on the improvement of spectral efficiency, ubiquitous coverage, enhanced quality of service (QoS) support, etc. This typically results in high end devices, such as state-of-the-art smartphones, tablets, etc. However, low cost, low rate (e.g., less than 100 kbps) devices should be supported as well. Some market projections show that the number of low cost devices may largely exceed the number of today's cell phones.

A study item on provision of low-cost MTC (machine-type communications) UEs based on LTE is conducted in LTE Rel-11. Particularly, the following items are under study: reduction of maximum bandwidth, use of a single receive RF chain, reduction of peak rate, reduction of transmit power, and half duplex operation.

Because the intended data rate for low cost devices is less than 100 kbps, it is possible to operate the device only at narrow bandwidth to reduce the cost of the device.

Two operational scenarios have been considered. One operational scenario is to set aside some narrow bandwidth, e.g. 1.25 MHz, to support the MTC operations. No standard changes are necessary for operations in this scenario. Another operational scenario is to operate low cost UEs in a large bandwidth. Low cost UEs may co-exist with regular UEs in this scenario.

There are two possible operations for low cost UEs in a large bandwidth. In the first operation, low cost UEs would operate at the same large bandwidth as other UEs, e.g., up to 20 MHz. There is no standard impact from doing this, but it is not helpful in reducing cost and battery power consumption of the UE. In the second operation, low cost UEs would operate with a smaller bandwidth than used by other UEs.

In LTE Rel-8/9/10, a physical downlink control channel (PDCCH) is located in the first several symbols in a subframe. PDCCH are distributed across the entire system bandwidth. PDCCH are time division multiplexed (TDMed) with PDSCH. Effectively, a subframe is divided into a control region and a data region.

In Rel-11, a new control (e.g., enhanced PDCCH (ePDCCH)) will be introduced. Unlike legacy PDCCH, which occupies the first several symbols in a subframe, an ePDCCH will occupy the data region, similar to a physical downlink shared channel (PDSCH). Using ePDCCH increases control channel capacity, supports frequency-domain inter-cell interference coordination (ICIC), improves spatial reuse of control channel resources, supports beamforming and/or diversity, operates on the new carrier type and in multimedia broadcast single frequency network (MBSFN) subframes, and allows new UEs receiving ePDCCH to utilize the same carrier as legacy UEs.

For MTC, a coverage enhancement of 20 dB (e.g., signals from MTC devices should be received by eNBs when the signals are 20 dB weaker than signals from non-MTC devices), when compared to non-MTC devices, is being considered by LTE study groups. A coverage enhancement of 20 dB allows signals from MTC devices to be received from larger distances than signals from non-MTC devices. For control channels (e.g., PDCCH and ePDCCH) as well as PDSCH, long TTI bundling has been considered to achieve downlink coverage enhancements. Also, narrowband operation is proposed to support this operation. Currently, a bundling size of hundreds of milliseconds is being considered for the control channels, which is very inefficient when compared to non-bundled communications, due to the necessity for a UE to be actively receiving (and a BS to be actively transmitting) for hundreds of milliseconds in order for the UE to receive control (e.g., scheduling) information indicating how and when the UE should transmit or receive user data.

In LTE Rel-8/9/10, transmission time interval (TTI) (or subframe) bundling can be configured on a per UE basis. The subframe bundling operation is configured by the parameter ttiBundling provided by higher layers. The parameter ttiBundling is a Boolean parameter (e.g., true/false) described in 3GPP TS 36.331, entitled "Evolved Universal Terrestrial Radio Access (E-UTRA); Radio Resource Control (RRC)," which is publicly available.

In LTE Rel-8/9/10, if TTI bundling is configured for a UE, the subframe bundling operation is only applied to UL-SCH.

Subframe bundling is not applied to other UL signals/traffic (such as uplink control information). The bundling size is fixed at 4 (subframes). That is, PUSCHs conveying identical data, but possibly encoded differently, will be transmitted by a UE configured for TTI bundling in 4 consecutive subframes. The same hybrid ARQ process number is used in each of the bundled subframes. The resource allocation size is restricted to up to 3 resource blocks (RBs). The modulation order is set to 2 (quadrature phase shift keying (QPSK)). A bundle is treated as a single resource, e.g., a single grant and a single hybrid-ARQ acknowledgement are used for each bundle. An eNodeB receiving the bundle may use the signal received in the 4 subframes to determine the conveyed data and send an acknowledgment or negative acknowledgment (ACK/NAK) for the bundle. TTI bundling is mainly for low rate traffic.

If voice over internet protocol (VoIP) packets cannot be transmitted in a single TTI due to a low uplink link budget, Layer 2 (L2) segmentation may be applied. For example, a VoIP packet could be segmented in 4 radio link control (RLC) protocol data units (PDUs) that are transmitted in 4 consecutive TTIs, and 2-3 HARQ retransmissions might be targeted to achieve sufficient coverage (e.g., each PDU might be retransmitted 2-3 times in order for the receiver to combine all of the transmissions and determine the content of the PDU).

This approach, L2 segmentation, may have drawbacks. For example, each additional segment introduces a 1 byte RLC, a 1 byte medium access control (MAC), and a 3 byte layer 1 (L1) cyclic redundancy check (CRC) overhead, e.g., 15% overhead assuming a 33 byte RLC service data unit (SDU) size. This means that for 4 segments, there is an additional combined L1 and L2 overhead of 45% (e.g., 15 bytes from each 33-byte RLC SDU are used for the overhead introduced by the segmentation operation). HARQ transmissions/retransmissions for every segment may require grants on PDCCH and possibly consume significant PDCCH resources. Each HARQ transmission or retransmission is followed by HARQ feedback on the physical HARQ indicator channel (PHICH). Assuming a NAK-ACK error ratio of $10^{-3}$ (e.g., 1 out of 1000 NAKs are erroneously interpreted as ACKs), the large number of HARQ feedback signals may lead to high packet loss probabilities. Packets may be lost because the transmitter does not retransmit a packet for which the transmitter erroneously received an ACK. For example, if 12 HARQ feedback signals are sent, the HARQ feedback error ratio might be on the order of $1.2*10^{-2}$. Packet loss rates of more than $10^{-2}$ are considered unacceptable for VoIP traffic.

Usage of only a single uplink grant and a single PHICH signal per TTI bundle may be advantageous over L2 segmentation. Also, L1 and L2 overhead would be reduced, since no L2 segmentation is required.

When an LTE network bundles hundreds of milliseconds for coverage enhancements, an MTC device has to perform both control and data decoding with long bundling. For example, if an eNB is transmitting to an MTC device configured to bundle TTIs in 200 millisecond bundles, then, in order to receive a transmission, the MTC device has to decode a control channel (e.g., a PDCCH) transmitted for 200 milliseconds, and a data channel scheduled by the control channel for at least 200 milliseconds.

The control channel overhead can be decreased by semi-persistent scheduling (SPS), however, when an MTC UE needs to perform a random access channel (RACH) procedure and receive an initial transmission resource assignment (e.g., an assignment before starting SPS), the MTC UE still has to decode a bundled PDCCH or ePDCCH.

When a UE does not have a wireless connection to an eNodeB, it may perform a RACH procedure to establish a connection. The RACH procedure is described in 3GPP TS 36.321, entitled "Evolved Universal Terrestrial Radio Access (E-UTRA); Medium Access Control (MAC) protocol specification," which is publicly available. During a RACH procedure, a UE selects one of sixty-four possible random access preambles or sequences, and transmits the sequence on a physical random access channel (PRACH) as Message 1 of the RACH procedure. An eNodeB may receive the PRACH, and transmit a random access response (RAR) referring to the sequence in a PDCCH containing an uplink grant as Message 2 of the RACH procedure. The UE may monitor PDCCHs from the eNodeB and detect the RAR referring to the UE's sequence. The UE can then transmit based on the uplink grant, establish a connection to the eNodeB, and be served by the eNodeB.

Example Control-Less Operation for Coverage Limited Machine-Type Communications (MTC)

According to certain aspects of the present disclosure, an MTC device can perform control-less operation for RACH. The procedure for control-less operation for RACH may be as follows.

For Message 1 (Msg 1) of a RACH procedure, an MTC device chooses a bundled (e.g., transmitted for a bundle of TTIs) RACH sequence to indicate to an eNB that the MTC device has coverage limitation. An MTC device may determine which RACH sequence(s) indicate coverage limitation by receiving a system information block (SIB) message from an eNodeB or by consulting a table of RACH sequences, for example. The transmission may be narrowband, e.g., 1 RB. The RB location of Msg 1 may be a function of the cell ID. The RACH sequence may also be a function of the cell ID.

For Message 2 (Msg 2) of the RACH procedure, the eNB may transmit a bundled (e.g., transmitted for a bundle of TTIs) RACH response. The RACH response may be transmitted in a bundled PDSCH, with or without (e.g., control-less operation) a PDCCH/ePDCCH scheduling the PDSCH. The RB or RBs of the bundled PDSCH (e.g., Msg 2) can be selected based on the RACH Msg 1 RB location, RACH sequence, RACH Msg 1 bundle size, cell ID, etc., or a combination thereof. The size of the bundled PDSCH and/or a PDCCH/ePDCCH scheduling the PDSCH, if not performing control-less operation, may be based on the RACH Msg 1 bundle size. The PDSCH modulation and coding scheme (MCS) may be either predefined or signaled in a system information block (SIB). The MCS may also be limited to a small set, for example, so that an MTC device may perform blind decoding to determine the MCS and decode the PDSCH. Msg 2 may explicitly indicate a bundle size to be used by the UE in transmitting Message 3 of the RACH procedure.

For Message 3 (Msg 3) of the RACH procedure, the MTC device may transmit a bundled PUSCH using the transmission resources specified in the assignment information from Msg 2.

Further messages between the eNodeB and MTC device may be transmitted on PDSCH or PUSCH with or without control channel transmissions granting the transmission resources used, e.g., each PDSCH may convey a grant for the next PDSCH and PUSCH, or SPS may be used.

Figure 5:
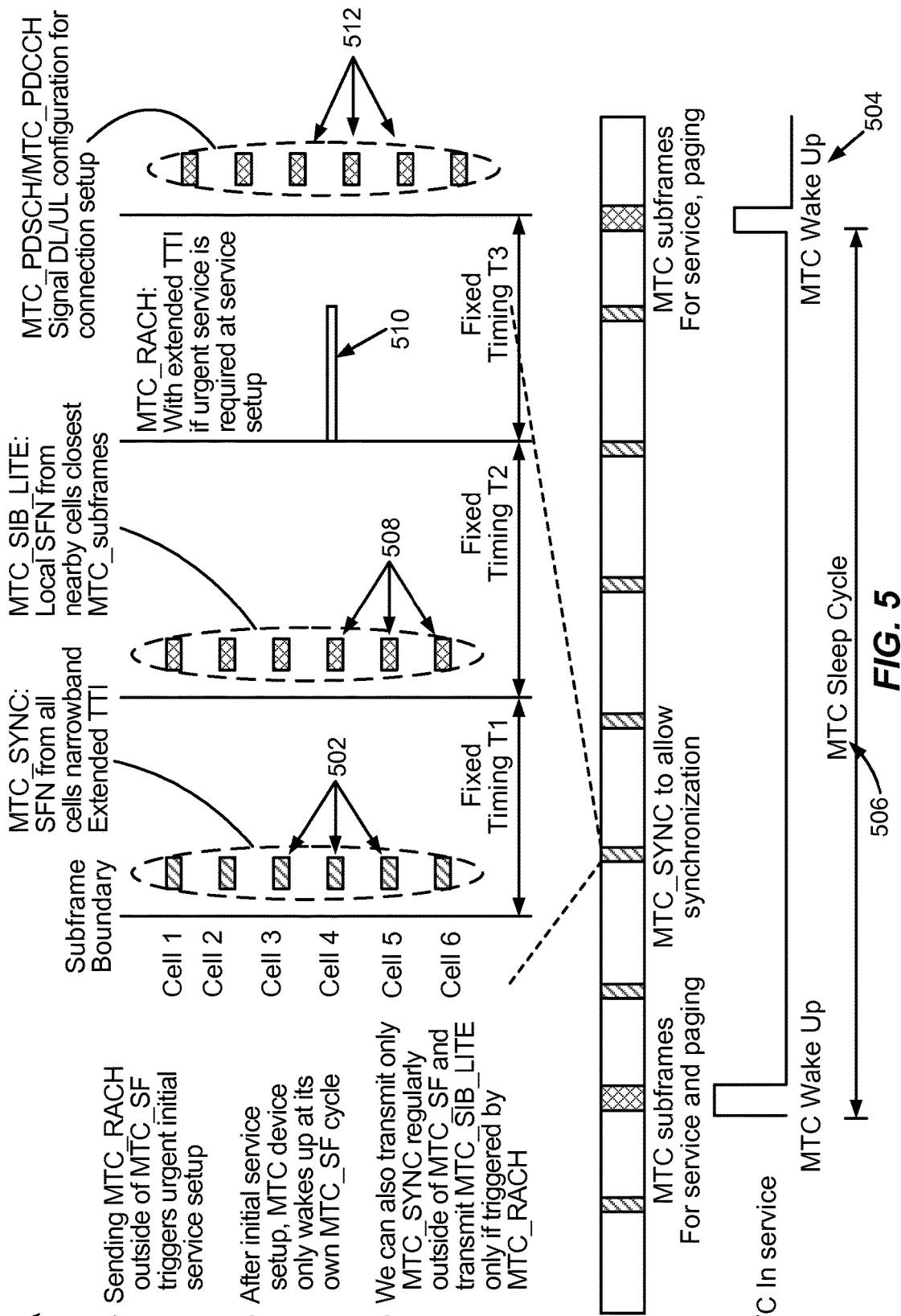
FIG. 5 illustrates example control-less random access channel (RACH) operations, in accordance with certain aspects of the present disclosure.

FIG. 5 illustrates exemplary control-less random access channel (RACH) operations 500, in accordance with certain aspects of the present disclosure.

According to certain aspects of the present disclosure, an eNB, such as eNB 110a in FIG. 1, may transmit synchronization signals or channels 502 for MTC devices periodically. For example, an eNB may transmit synchronization signals or channels directed to MTC devices during every other frame (e.g., once per 20 ms). An MTC device may wake up at 504 after a long sleep cycle 506 and detect MTC synchronization signals or other downlink (DL) transmissions from the eNB. An MTC device may receive an MTC_SIB_LITE 508 and determine a system frame number (SFN) and other information regarding an eNB. The MTC_SIB_LITE may be transmitted a fixed number of subframes after the synchronization signals. An MTC device may initiate a RACH procedure to connect to an eNB by transmitting an MTC_RACH 510 (e.g., Msg 1 of a RACH procedure). An eNB may respond to the MTC_RACH with a MTC_PDSCH or a MTC_PDCCH (e.g., Msg 2 of a RACH procedure) 512.

According to certain aspects of the present disclosure, when performing a RACH procedure, an MTC device may transmit a RACH sequence (e.g., Msg 1) selected based on the cell ID of the cell which transmitted the detected DL transmissions. According to certain aspects, an MTC device may transmit a RACH sequence on transmission resources (e.g., RBs) determined based on the cell ID of the cell which transmitted the detected DL transmissions. For Msg 1 of the RACH procedure, if the MTC device is coverage limited, the MTC device may transmit a RACH sequence selected to indicate the MTC device is requesting to use bundled communications. For Msg 2, the MTC device may search RBs corresponding to Msg 1 (e.g., 3 subframes after Msg 1 was sent) for a bundled PDSCH transmission. If the MTC device receives and decodes a PDSCH, then the MTC device extracts the transmission resource (e.g., RBs) assignment information to be used by the MTC device to transmit Msg 3. For Msg 3, the MTC device may transmit a bundled PUSCH. If the cell receives Msg 3, the cell may reply to the MTC device with Msg 4. The cell may transmit a bundled PDSCH as Msg 4. In Msg 4, the MTC device may receive a bundled PDSCH transmission with transmission resource assignment information for a following (e.g., subsequent) message (or messages).

According to certain aspects of the present disclosure, a similar design can be applied to a PDCCH/ePDCCH based random access response (RAR) as well. That is, the location or decoding candidate(s) of a PDCCH or ePDCCH scheduling PDSCH carrying the RAR can be linked with RACH Msg 1 RB(s), sequence, RACH Msg 1 bundle size, cell ID, etc., or a combination thereof.

Figure 6:
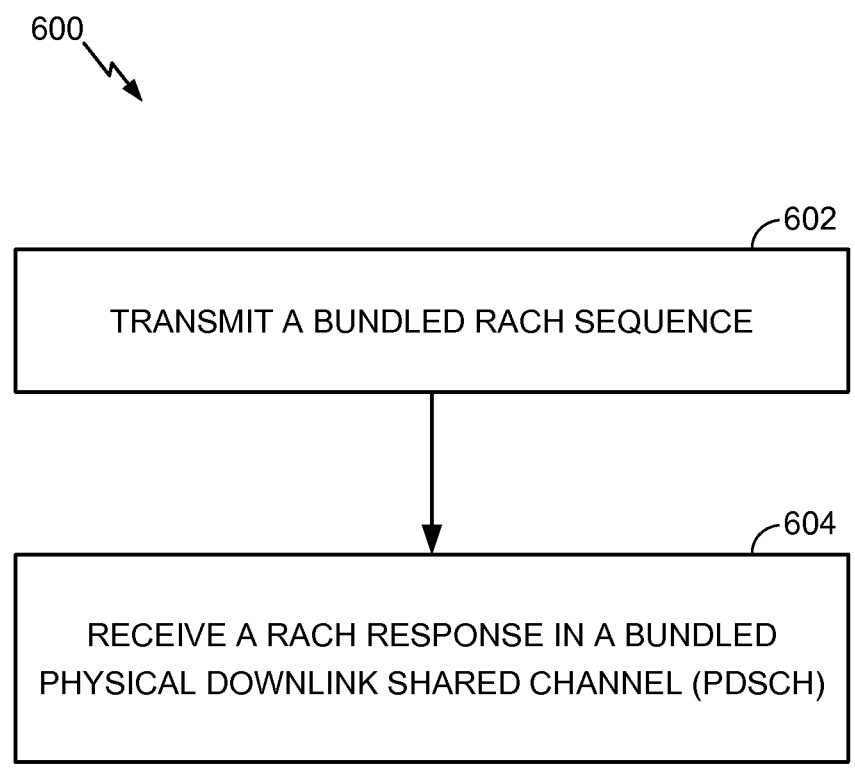
FIG. 6 illustrates example operations for wireless communications, by a user equipment (UE), in accordance with certain aspects of the present disclosure.

FIG. 6 illustrates example operations 600 that may be performed by a user equipment (UE), in accordance with certain aspects of the present disclosure. The operations may be performed by UE 120a, for example. At 602, the UE may transmit a bundled random access channel (RACH) sequence. For example, UE 120a may transmit Msg 1 of a RACH sequence to eNB 110a using a preamble selected to indicate the UE requests to communicate using TTI bundling. At 604, the UE may receive a RACH response in a bundled physical downlink shared channel (PDSCH). For example, UE 120a may receive Msg 2 of a RACH sequence in a PDSCH bundled over 100 TTIs.

Figure 7:
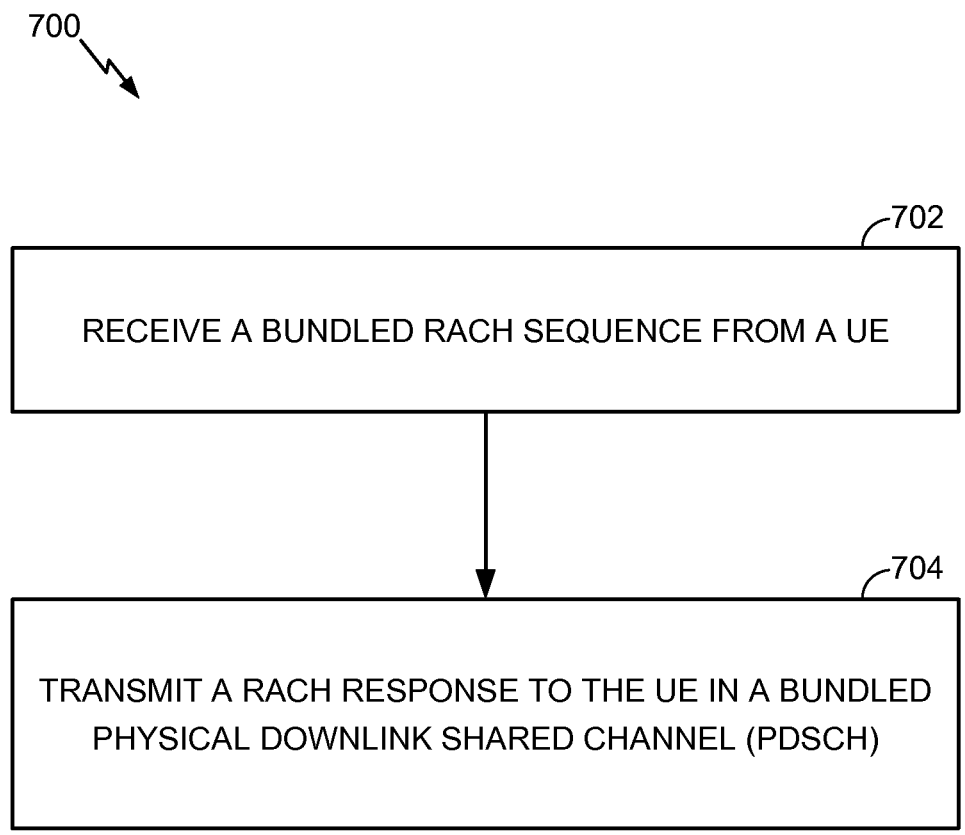
FIG. 7 illustrates example operations for wireless communications, by a base station (BS), in accordance with certain aspects of the present disclosure.

FIG. 7 illustrates example operations 700 that may be performed by a base station (BS), in accordance with certain aspects of the present disclosure. The operations 700 may be complementary to the operations 600, and may be performed by eNB 110a, for example. At 702, the BS may receive a bundled random access channel (RACH) sequence from a UE. For example, eNB 110a may receive Msg 1 of a RACH sequence indicating a request to use TTI bundling from UE 120a. At 704, the BS may transmit a RACH response to the UE in a bundled physical downlink shared channel (PDSCH). For example, eNB 110a may transmit Msg 2 of a RACH sequence to UE 120a in a PDSCH bundled over 100 TTIs.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for performing a random access channel (RACH) procedure by a user equipment (UE), comprising:
transmitting a bundled RACH sequence, wherein transmitting the bundled RACH sequence comprises transmitting the RACH sequence during a first plurality of transmission time intervals (TTIs); and
receiving a RACH response in a first bundled physical downlink shared channel (PDSCH), wherein identical data is received in each TTI of a second plurality of TTIs in the RACH response.

2. The method of claim 1, further comprising:
transmitting a bundled physical uplink shared channel (PUSCH) based on the received bundled PDSCH, wherein transmitting the bundled PUSCH comprises transmitting the bundled PUSCH during a third plurality of TTIs.

3. The method of claim 2, wherein a size of the bundled PUSCH is signaled in the first bundled PDSCH.

4. The method of claim 1, wherein the bundled RACH sequence indicates a coverage limitation of the UE.

5. The method of claim 1, wherein the bundled RACH sequence is transmitted as a narrowband transmission comprising at least one resource block (RB) in each of the first plurality of TTIs, wherein the location of the at least one RB is a function of a cell ID.

6. The method of claim 1, wherein the bundled RACH sequence is a function of a cell ID.

7. The method of claim 1, wherein locations of resource blocks (RBs) of the first bundled PDSCH are linked to at least one of a location of an RB of the RACH sequence, the RACH sequence itself, a size of the bundled RACH sequence, or a cell ID.

8. The method of claim 1, wherein a size of the first bundled PDSCH is based on a size of the bundled RACH sequence.

9. The method of claim 1, further comprising:
receiving a bundled physical downlink control channel (PDCCH) or enhanced PDCCH (ePDCCH), wherein receiving the bundled PDCCH or ePDCCH comprises receiving the bundled PDCCH or ePDCCH during a third plurality of TTIs, wherein the bundled PDCCH or ePDCCH schedules the first bundled PDSCH, and wherein the size of the bundled PDCCH or ePDCCH is based on a size of the bundled RACH sequence.

10. The method of claim 1, wherein a modulation and coding scheme (MCS) of the first bundled PDSCH is signaled in a system information block (SIB).

11. The method of claim 1, wherein the first bundled PDSCH is transmitted using a modulation and coding scheme (MCS) selected from a set of MCSs and the UE detects the first bundled PDSCH via blind decoding using the set of MCSs.

12. The method of claim 1, further comprising:
receiving synchronization signals; and
waking up to perform the RACH procedure based on the synchronization signals.

13. The method of claim 1, further comprising:
receiving a second bundled PDSCH indicating an assignment for one or more subsequent messages, wherein receiving the second bundled PDSCH comprises receiving the second bundled PDSCH during a third plurality of TTIs.

14. A method for performing a random access channel (RACH) procedure by a base station (BS), comprising:
receiving a bundled RACH sequence from a user equipment (UE), wherein receiving the bundled RACH sequence comprises receiving the RACH sequence during a first plurality of transmission time intervals (TTIs); and transmitting a RACH response to the UE in a first bundled physical downlink shared channel (PDSCH), wherein identical data is transmitted in each TTI of a second plurality of TTIs in the RACH response.

15. The method of claim 14, further comprising:
receiving a bundled physical uplink shared channel (PUSCH) from the UE, based on the first bundled PDSCH, wherein receiving the bundled PUSCH comprises receiving the bundled PUSCH during a third plurality of TTIs.

16. The method of claim 15, wherein a size of the bundled PUSCH is signaled in the first bundled PDSCH.

17. The method of claim 14, wherein the bundled RACH sequence indicates a coverage limitation of the UE.

18. The method of claim 14, wherein the bundled RACH sequence is received as a narrowband transmission comprising at least one resource block (RB) in each of the first plurality of TTIs, wherein the location of the at least one RB is a function of a cell ID.

19. The method of claim 14, wherein the bundled RACH sequence is a function of a cell ID.

20. The method of claim 14, wherein locations of resource blocks (RBs) of the first bundled PDSCH are linked to at least one of a location of an RB of the RACH sequence, the RACH sequence itself, a size of the bundled RACH sequence, or a cell ID.

21. The method of claim 14, wherein a size of the first bundled PDSCH is based on a size of the bundled RACH sequence.

22. The method of claim 14, further comprising:
transmitting a bundled physical downlink control channel (PDCCH) or enhanced PDCCH (ePDCCH), wherein transmitting the bundled PDCCH or ePDCCH comprises transmitting the bundled PDCCH or ePDCCH during a third plurality of TTIs, wherein the bundled PDCCH or ePDCCH schedules the first bundled PDSCH, and wherein the size of the bundled PDCCH or ePDCCH is based on a size of the bundled RACH sequence.

23. The method of claim 14, wherein a modulation and coding scheme (MCS) of the first bundled PDSCH is signaled in a system information block (SIB).

24. The method of claim 14, wherein the first bundled PDSCH is transmitted using a modulation and coding scheme (MCS) selected from a set of MCSs and the UE detects the first bundled PDSCH via blind decoding using the set of MCSs.

25. The method of claim 14, further comprising:
transmitting synchronization signals, wherein the UE wakes up to perform the RACH procedure based on the synchronization signals.

26. The method of claim 14, further comprising:
transmitting a second bundled PDSCH indicating an assignment for one or more subsequent messages, wherein transmitting the second bundled PDSCH comprises transmitting the second bundled PDSCH during a third plurality of TTIs.

27. An apparatus for performing a random access channel (RACH) procedure by a user equipment (UE), comprising:
means for transmitting a bundled RACH sequence, wherein transmitting the bundled RACH sequence comprises transmitting the RACH sequence during a first plurality of transmission time intervals (TTIs); and means for receiving a RACH response in a bundled physical downlink shared channel (PDSCH), wherein identical data is received in each TTI of a second plurality of TTIs in the RACH response.

28. An apparatus for performing a random access channel (RACH) procedure by a base station (BS), comprising:
means for receiving a bundled RACH sequence from a user equipment (UE), wherein receiving the bundled RACH sequence comprises receiving the RACH sequence during a first plurality of transmission time intervals (TTIs); and means for transmitting a RACH response to the UE in a first bundled physical downlink shared channel (PDSCH), wherein identical data is transmitted in each TTI of a second plurality of TTIs in the RACH response.

29. An apparatus for performing a random access channel (RACH) procedure, comprising:
at least one processor; and
memory coupled to the at least one processor, the memory comprising instructions executable by the at least one processor to cause the apparatus to:
transmit a bundled RACH sequence, wherein transmitting the bundled RACH sequence comprises transmitting the RACH sequence during a first plurality of transmission time intervals (TTIs); and
receive a RACH response in a first bundled physical downlink shared channel (PDSCH), wherein identical data is received in each TTI of a second plurality of TTIs in the RACH response.

30. An apparatus for performing a random access channel (RACH) procedure, comprising:
at least one processor; and
memory coupled to the at least one processor, the memory comprising instructions executable by the at least one processor to cause the apparatus to:
receive a bundled RACH sequence from a user equipment (UE), wherein receiving the bundled RACH sequence comprises receiving the RACH sequence during a first plurality of transmission time intervals (TTIs); and
transmit a RACH response to the UE in a first bundled physical downlink shared channel (PDSCH), wherein identical data is transmitted in each TTI of a second plurality of TTIs in the RACH response.

31. A non-transitory computer-readable medium having computer-executable code stored thereon for performing a random access channel (RACH) procedure by a user equipment (UE), comprising:
code for transmitting a bundled RACH sequence, wherein transmitting the bundled RACH sequence comprises transmitting the RACH sequence during a first plurality of transmission time intervals (TTIs); and
code for receiving a RACH response in a bundled physical downlink shared channel (PDSCH), wherein identical data is received in each TTI of a second plurality of TTIs in the RACH response.

32. A non-transitory computer-readable medium having computer-executable code stored thereon for performing a random access channel (RACH) procedure by a base station (BS), comprising:
code for receiving a bundled RACH sequence from a user equipment (UE), wherein receiving the bundled RACH sequence comprises receiving the RACH sequence during a first plurality of transmission time intervals (TTIs); and code for transmitting a RACH response to the UE in a first bundled physical downlink shared channel (PDSCH), wherein identical data is transmitted in each TTI of a second plurality of TTIs in the RACH response.

* * * * *